US011315384B2

(12) United States Patent
Uberuaga et al.

(10) Patent No.: US 11,315,384 B2
(45) Date of Patent: Apr. 26, 2022

(54) INTERACTIVE ELECTRONIC REEL GAMING MACHINE PROVIDING CUMULATIVE FREE GAMES AND A SPINNING WHEEL FEATURE

(71) Applicant: Aristocrat Technologies Australia Pty Limited, North Ryde (AU)

(72) Inventors: Christmas Uberuaga, Reno, NV (US); David Kaminkow, Las Vegas, NV (US); Gary Penacho, Henderson, NV (US)

(73) Assignee: Aristocrat Technologies Australia Pty Limited

( * ) Notice: Subject to any disclaimer, the term of this patent is extended or adjusted under 35 U.S.C. 154(b) by 0 days.

(21) Appl. No.: 16/539,749

(22) Filed: Aug. 13, 2019

(65) Prior Publication Data

US 2020/0074791 A1 Mar. 5, 2020

Related U.S. Application Data

(60) Provisional application No. 62/725,587, filed on Aug. 31, 2018.

(51) Int. Cl.

*G06F 17/00* (2019.01)
*G07F 17/32* (2006.01)
*G07F 17/34* (2006.01)

(52) U.S. Cl.

CPC ...... *G07F 17/3213* (2013.01); *G07F 17/3267* (2013.01); *G07F 17/34* (2013.01)

(58) Field of Classification Search

None

See application file for complete search history.

(56) References Cited

U.S. PATENT DOCUMENTS

| | | | | |
|---|---|---|---|---|
| D423,483 | S | 4/2000 | Hodgson | |
| 6,491,584 | B2 | 12/2002 | Graham | |
| 6,604,740 | B1 | 8/2003 | Singer | |
| D479,531 | S | 9/2003 | Yanagida | |
| D519,515 | S | 4/2006 | Mugura | |
| 7,070,501 | B2 | 7/2006 | Cormack | |
| 7,326,109 | B2 | 2/2008 | Baerlocher | |
| 7,559,837 | B1 * | 7/2009 | Yoseloff .............. | G07F 17/3265 273/143 R |
| D603,416 | S | 11/2009 | Poling | |
| 7,632,184 | B2 | 12/2009 | Gauselmann | |

(Continued)

OTHER PUBLICATIONS

Harley Davidson Slot Machine, https://www.youtube.com/watch?v=SFMgMDDwbOg.

(Continued)

*Primary Examiner* — Paul A D'Agostino
(74) *Attorney, Agent, or Firm* — McAndrews, Held & Malloy, Ltd.

(57) ABSTRACT

An interactive electronic gaming machine that includes cumulative free games and a spinning wheel feature is disclosed. The interactive electronic gaming machine is a video slot machine game that includes a base game, cumulative free games, and a spinning wheel feature. The spinning wheel feature may include a plurality of values, selectable in response to a spin and stop of the spinning wheel. The selected value can include a multiplier associated with cumulative free games, which enhances a payout to a player of the interactive electronic gaming machine.

20 Claims, 10 Drawing Sheets

(56) References Cited

U.S. PATENT DOCUMENTS 7,675,514 B2 3/2010 Ni
7,758,414 B1 7/2010 Marks
D622,283 S 8/2010 Van Os
7,874,915 B2 1/2011 Caspers et al.
8,231,456 B2 7/2012 Zielinski
D664,992 S 8/2012 Pizzutelli
D665,418 S 8/2012 Pizzutelli
D665,419 S 8/2012 Pizzutelli
8,298,070 B2 10/2012 Kato
8,360,851 B2 1/2013 Aoki
8,460,094 B2 6/2013 Bigelow, Jr.
8,491,390 B2 7/2013 Cregan
D687,449 S 8/2013 Van Os
8,562,418 B2 10/2013 Gomez et al.
8,608,539 B2 12/2013 Itagaki
8,690,659 B2 4/2014 Moody
8,702,489 B2 4/2014 Cuddy
D715,827 S 10/2014 Lacour
D717,826 S 11/2014 Lacour
D718,331 S 11/2014 Lacour
D744,509 S 12/2015 Moriya
D745,036 S 12/2015 Joynes
9,240,105 B2 1/2016 Kadlec
D751,111 S 3/2016 Zhou
D752,091 S 3/2016 Zhou
D754,154 S 4/2016 Moon
D754,155 S 4/2016 Moon
D761,300 S 7/2016 Haitani
D761,845 S 7/2016 Haitani
9,396,616 B2 7/2016 Baerlocher
D763,305 S 8/2016 Hashimoto
D763,867 S 8/2016 Moon
D766,943 S 9/2016 Moriya
D771,075 S 11/2016 Moriya
9,536,392 B1* 1/2017 Luciano, Jr. ........ G07F 17/3288
D791,802 S 7/2017 Solop
D805,529 S 12/2017 Hersh
9,836,917 B2 12/2017 Bennett
D810,767 S 2/2018 Sharma
D813,880 S 3/2018 Davis
D813,881 S 3/2018 Davis
D823,877 S 7/2018 Ludwick
10,147,264 B1* 12/2018 Halvorson .......... G07F 17/3244
D837,828 S 1/2019 Cros
10,262,501 B2 4/2019 Satterlie
D869,483 S 12/2019 Wilde
D875,109 S 2/2020 Upton
D881,223 S 4/2020 Tuomey
10,733,846 B2 8/2020 Wright
10,818,145 B2 10/2020 Kendall
D904,452 S 12/2020 Kroon
D905,095 S 12/2020 Park
10,896,567 B2 1/2021 Rizos
D912,158 S 3/2021 Marks
2005/0070354 A1 3/2005 Baerlocher
2005/0075163 A1 4/2005 Cuddy
2007/0060321 A1* 3/2007 Vasquez .................. G07F 17/32 463/27
2007/0184887 A1* 8/2007 Cannon ............... G07F 17/3258 463/16
2007/0213114 A1 9/2007 Caspers
2008/0026822 A1* 1/2008 Walker .................... G07F 17/32 463/25
2008/0076513 A1 3/2008 Esses
2008/0113779 A1 5/2008 Cregan
2009/0061985 A1 3/2009 Inamura
2009/0104977 A1* 4/2009 Zielinski ............. G07F 17/3267 463/25
2010/0016061 A1 1/2010 Gomez
2010/0120495 A1 5/2010 Frank
2010/0120499 A1* 5/2010 Cohen ................. G07F 17/3267 463/20
2010/0234089 A1* 9/2010 Saffari .................... G07F 17/34 463/20
2010/0234091 A1* 9/2010 Baerlocher ............. G07F 17/34 463/20
2011/0105216 A1* 5/2011 Cohen ................. G07F 17/3244 463/20
2011/0107223 A1 5/2011 Tilton
2011/0118010 A1* 5/2011 Brune ................. G07F 17/3267 463/27
2011/0130191 A1 6/2011 Englman
2011/0136562 A1 6/2011 Loat
2011/0263317 A1 10/2011 Marks
2013/0065663 A1 3/2013 Johnson
2013/0159928 A1 6/2013 Joynes
2013/0252704 A1* 9/2013 Gilbertson .......... G07F 17/3213 463/20
2013/0273997 A1 10/2013 Stewart
2013/0310157 A1 11/2013 Baerlocher
2014/0040810 A1 2/2014 Haliburton
2014/0051496 A1 2/2014 Meyer
2014/0059490 A1 2/2014 Grace
2014/0137020 A1 5/2014 Sharma
2014/0141866 A1 5/2014 Irwin, Jr. et al.
2014/0323198 A1 10/2014 Tuck
2015/0018070 A1 1/2015 Meyer
2015/0031444 A1* 1/2015 Colvin ................ G07F 17/3232 463/25
2015/0206397 A1* 7/2015 Nelson ................ G07F 17/3218 463/42
2015/0248810 A1 9/2015 Wortmann
2015/0287269 A1 10/2015 Berman
2015/0310699 A1 10/2015 Meyer
2015/0332560 A1* 11/2015 Fulton ................. G07F 17/3232 463/20
2016/0042597 A1 2/2016 Olive
2016/0253873 A1 9/2016 Olive
2016/0328926 A1* 11/2016 Boese ................... G07F 17/323
2017/0032611 A1 2/2017 Luong
2017/0053496 A1 2/2017 Borissov
2017/0148274 A1 5/2017 Olive
2017/0301177 A1 10/2017 Pawloski
2017/0309119 A1 10/2017 San
2018/0082546 A1* 3/2018 Mariscal ............. G07F 17/3244
2018/0130286 A1* 5/2018 Berman .............. G07F 17/3244
2018/0268659 A1 9/2018 Chesworth
2019/0043313 A1* 2/2019 Cong .................. G07F 17/3209
2019/0051096 A1 2/2019 San
2019/0102986 A1 4/2019 Nelson
2019/0355218 A1 11/2019 Visser
2020/0074791 A1 3/2020 Uberuaga
2021/0069594 A1 3/2021 Sensui

OTHER PUBLICATIONS

Harley Davidson Slot Machine, https://www.youtube.com/watch?v=2ob0XY-IV9U.
Office Action dated Aug. 5, 2020 for U.S. Appl. No. 16/558,735 (pp. 1-9).
Office Action dated Sep. 25, 2020 for U.S. Appl. No. 16/566,446 (pp. 1-11).
Notice of Allowance dated Nov. 18, 2020 for U.S. Appl. No. 16/558,735 (pp. 1-7).
Supplemental Notice of Allowability dated Jan. 25, 2021 for U.S. Appl. No. 16/558,735 (pp. 1-2).
Notice of Allowance dated Jan. 28, 2021 for U.S. Appl. No. 16/566,446 (pp. 1-9).
Notice of Allowance dated Feb. 24, 2021 for U.S. Appl. No. 16/558,735 (pp. 1-7).
Corrected Notice of Allowability dated Apr. 7, 2021 for U.S. Appl. No. 16/566,446 (pp. 1-2).
Office Action dated Apr. 15, 2021 for U.S. Appl. No. 29/662,088 (pp. 1-9).
Buffalo Diamond Slot Machine from Aristocrat, This Week in Gambling, dated Oct. 12, 2019, youtube.com [online]. Retrieved Apr. 10, 2021 from internet <URL:https://www.youtube.com/watch?v=se1ET2x989U> (Year: 2019).
Notice of Allowance dated May 27, 2021 for U.S. Appl. No. 16/558,735 (pp. 1-7).

(56) References Cited

OTHER PUBLICATIONS

Notice of Allowance dated May 28, 2021 for U.S. Appl. No. 29/662,088 (pp. 1-5).
Office Action dated Jun. 8, 2021 for U.S. Appl. No. 29/726,817 (pp. 1-10).
Notice of Allowance dated Sep. 3, 2021 for U.S. Appl. No. 29/726,817 (pp. 1-7).
Office Action dated Jan. 7, 2021 for U.S. Appl. No. 16/415,459 (pp. 1-12).
Australian Examination Report No. 1 for App. No. AU2019268090, dated Jan. 6, 2021, 6 pages.
Office Action (Final Rejection) dated Jul. 28, 2021 for U.S. Appl. No. 16/415,459 (pp. 1-27).

* cited by examiner

INTERACTIVE ELECTRONIC REEL GAMING MACHINE PROVIDING CUMULATIVE FREE GAMES AND A SPINNING WHEEL FEATURE

RELATED APPLICATIONS

This application claims priority to U.S. Provisional Patent Application No. 62/725,587 filed Aug. 31, 2018 and entitled "An Interactive Electronic Reel Gaming Machine Providing Cumulative Free Games and a Spinning Wheel Feature," which is hereby incorporated by reference herein in its entirety.

Further, U.S. Design patent application Ser. No. 29/661,980 filed Aug. 31, 2018 and entitled "Display Screen or Portion Thereof with Graphical User Interface," and U.S. Design patent application Ser. No. 29/662,088 filed Aug. 31, 2018 and entitled "Display Screen or Portion Thereof with Graphical User Interface," are hereby incorporated by reference herein in their entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Conventional electronic reel games display three reels that represent mechanical reels. Such conventional games accepted a single input (e.g., start), and show a row of symbols, typically three in a vertically spinning reel. All three symbols must match to provide a payout. Gaming machines that offer these types of games provide limited functionality, and allow for limited player interaction. A need exists in the industry to improve gaming machine operations and player interactions.

SUMMARY

Systems, devices and methods for an interactive electronic reel game are disclosed that includes cumulative free games and a spinning wheel feature. The interactive electronic gaming machine is a video slot machine game that includes a base game, cumulative free games, and a spinning wheel feature. Multiple levels of cumulative free games are available to a player, as well as multiple levels of award multipliers and progressive jackpots to enhance a gaming experience. The spinning wheel feature may include a plurality of values, selectable in response to a spin and stop of the spinning wheel. The selected value can include a multiplier associated with cumulative free games, which enhances a payout to a player of the interactive electronic gaming machine.

In disclosed examples, a gaming machine includes an user graphical user interface (GUI) including a display and one or more inputs, for example, from a player. The gaming machine includes a game controller, which includes a processor and memory to store program code including instructions. The game controller is configured to execute the instructions, which causes the game controller to, at least display first and second wager levels on the display. In examples, the first wager level corresponding to a first probability of being granted a free game and the second wager level corresponding to a second probability of being granted a free game. The game controller receives a first input, such as by a player, corresponding to selection of the first or second wager level. In response to the first input, the game controller spins one or more reels of a reel game. Based on a selected wager level, a first output corresponding to the probability of being granted a free game from a random number generator (RNG) is generated, and a number of granted free games is determined. As a result, one or more symbols corresponding to the generated first output are displayed, such as on the user interface.

In some disclosed examples, a gaming machine includes a game controller comprising a processor and memory, the memory storing program code including instructions, the game controller executing the instructions, which cause the game controller to, at least receive a first input corresponding to selection of a wager level of a plurality of wager levels. A first output is generated from a random number generator (RNG) call for a first reel of the plurality of reels. The first output is mapped to one or more lookup tables and a trigger symbol indicative of an increase of a free game is identified, based on the mapping of the first output. A free game meter of one or more free game meters corresponding to the trigger symbol is caused to increase in response to the identified free game. In other examples, a graphical user interface (GUI) for playing a game on a gaming machine is disclosed. The gaming machine includes a game controller with a processor and memory storing program code, which includes instructions to provide cumulative free games and initiate a wheel spin feature. The instruction include receiving, via the GUI, an input to play a reel game. Spinning a plurality of reels, which are displayed on the GUI, such that each reel displays one or more symbols in response to the input from the GUI. The spinning plurality of reels are stopped to display a plurality of symbols. The instructions then identify, by the processor, a cumulative free game trigger symbol within the plurality of symbols. In response, an award value of a cumulative free game meter in accordance with the cumulative free game trigger symbol is incremented and displayed on the GUI.

DETAILED DESCRIPTION

Figure 1:
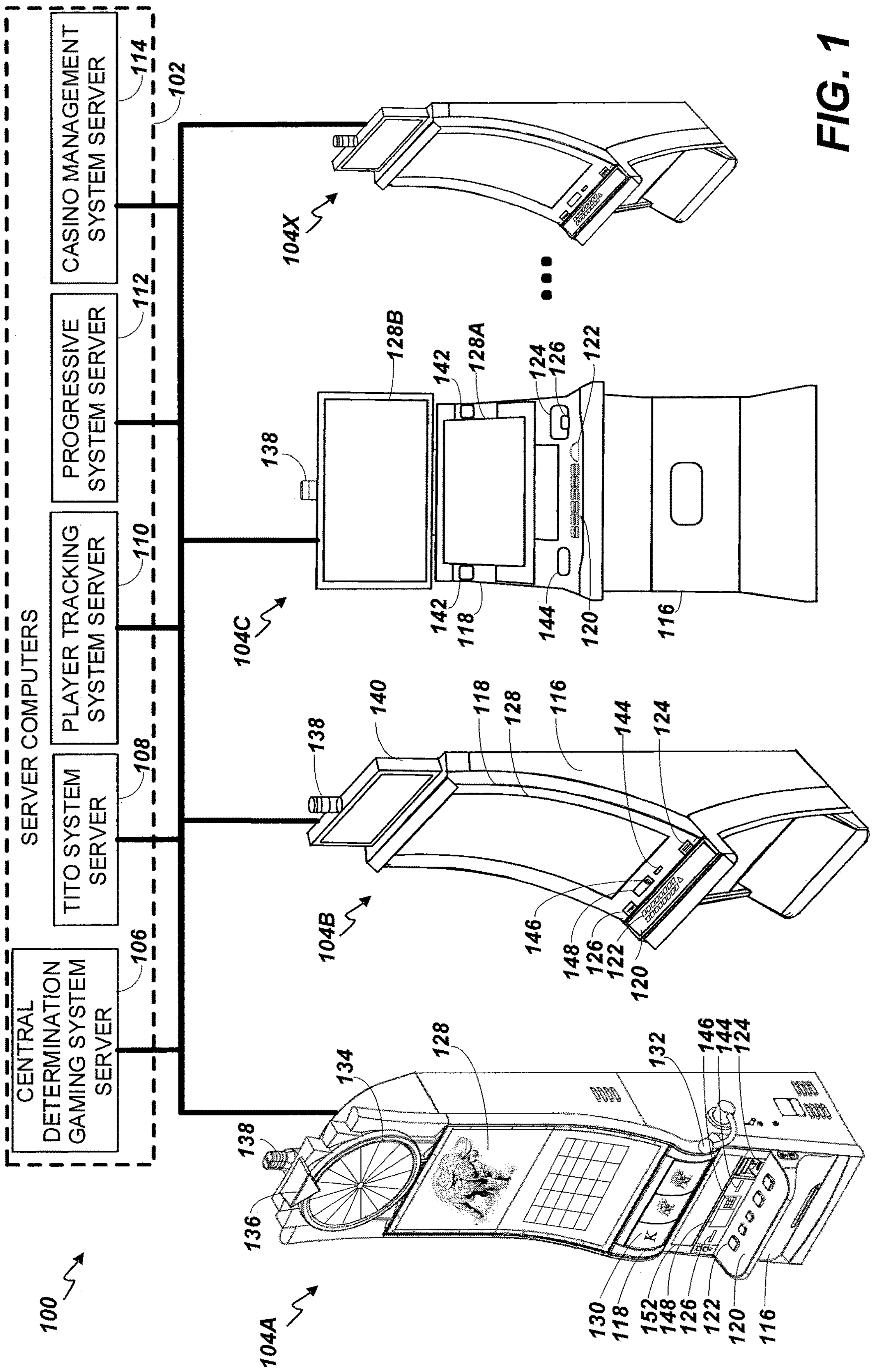
FIG. 1 is an exemplary diagram showing several electronic gaming machines networked with various gaming related servers.

Systems, devices and methods for an interactive electronic reel game that includes a plurality of cumulative free games play feature award levels each with an associated credit award multiplier, as well as a wheel gateway feature that transitions play to a spinning wheel feature. In the spinning wheel feature, a level of free games play feature award and associated credit award multiplier is selected, with credit award payouts to the player according to the outcome of the selected free games play feature and associated credit award multiplier.

An example base game displays a plurality of vertically spinning reels. A number of cumulative free games play features are provided for award as a bonus round, with values and multipliers associated with each cumulative free games play feature in a cumulative free games meter. The cumulative free games meters, which are incremented in response to a trigger symbol (e.g., a particular symbol or symbols, or combination thereof) being displayed in the reel-type game, can be incremented based on a base game wager and/or one or more outcomes, such as from a RNG call and/or associated with a lookup table reference, to extend gameplay or add value to a possible award during the bonus round. In some examples, as the number of free games of each cumulative free game feature increases during play of the base game, the player's game equity may also increase, as both may increase during gameplay based on the trigger symbols and/or outcomes. For instance, during base game play, a predetermined trigger symbol (e.g., revealed within a reel) or an overlay of a predetermined trigger symbol may land on the display. Upon identification of the trigger symbol during the base game, a cumulative free games meter increases accordingly. As used herein, a trigger or trigger symbol may be generated and/or presented during gameplay to prompt a response. In some examples, a trigger symbol may be generated based on one or more game elements or occurrences, such as a wager amount or other user input. In some examples, the trigger symbol is provided at random (e.g., as an RNG outcome), such as during a reel play. In some examples, the trigger symbol itself, and/or the prompted response, is selected at random.

Additionally or alternatively, a symbol or group of symbols can trigger the wheel gateway feature. For example, the group of symbols displayed could be scatter symbols located on any or all of the available reels that trigger the wheel gateway feature. The wheel gateway feature may be included with or in addition to a plurality of reels provided in a reel game (e.g. vertically and/or horizontally spinning reels, such as a reel-power game). Upon presentment of the trigger symbol(s), the wheel gateway feature initiates a transition to the spinning wheel feature, which indicates the level of free spin granted to the player.

On conventional slot machines, free games award values are kept at a fixed amount. By contrast, EGMs with cumulative free games dynamically increase the free games award amount in response to a play of a base game, a level of base game wager, a player's winnings, etc. For example, a probability of being granted a cumulative free game may be further determined by an RNG output and/or by reference to one or more lookup tables. In some examples, the RTP corresponds with a level of the cumulative free games achieved during play, and/or can be based on an RNG outcome. These techniques increase the level of volatility during gameplay while complying with a given RTP.

Additionally, an EGM may have standalone cumulative free games awards in which the cumulative free game meters are increased by and provided to a single EGM. Alternatively, in an embodiment, a plurality of EGMs may be connected, e.g., by a local or wide area network, and have one or more shared cumulative free games awards where each connected EGM dynamically contributes to the increase of the one or more shared cumulative free games meters, each of which may then be provided to any of the connected EGMs. Thus, a cumulative free games winning value is shared and updated by multiple players, increasing the possibility of a large free games award and thereby increasing the possibility of a large credit award payout. Unlike some other reel-type games, no strategy or system can increase your chances of winning a cumulative free games award, thereby increasing your chances of winning a large credit award payout on a slot machine game. Thus, with cumulative free games incorporated into gameplay, even as the odds of winning (such as a jackpot) are low, the number of opportunities to win increases when cumulative free games are available. Furthermore, increasing a bet level may increase the probability a cumulative free games feature is triggered and additional free games are provided. As used herein, an award may include a payout, a jackpot, a credit award, a monetary amount, or other item of value provided to the player based on one or more game outcomes.

In view of the foregoing, the interactive EGMs described herein provide significant improvements over conventional electronic gaming systems. For example, conventional gaming systems provide players with a fixed number of free games option. By contrast, the EGM of the present disclosure provides multiple (e.g., three) cumulative free game levels, presented to the player in distinct cumulative free games meters. Further, conventional gaming systems provide no trigger that transitions play to a spinning wheel feature, where the levels of cumulative free games may be applied to a player's free games bonus feature, and subsequent bonus feature credit winnings. The EGM is designed to incorporate volatility in assessing and assigning probabilities to one or more game outcomes during gameplay. For instance, which trigger should be presented and what award and/or feature (including a number or level of cumulative free games) should be provided in response, as well as upon which user input and/or game outcome the trigger should be based, may be selected randomly (e.g., based on an RNG output).

FIG. 1 illustrates several different models of EGMs, which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X may communicate with one another and/or the server computers 102 using a variety of over communication-based technologies, such as radio frequency (RF), (e.g., wireless fidelity (WiFi®) and Bluetooth®) cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
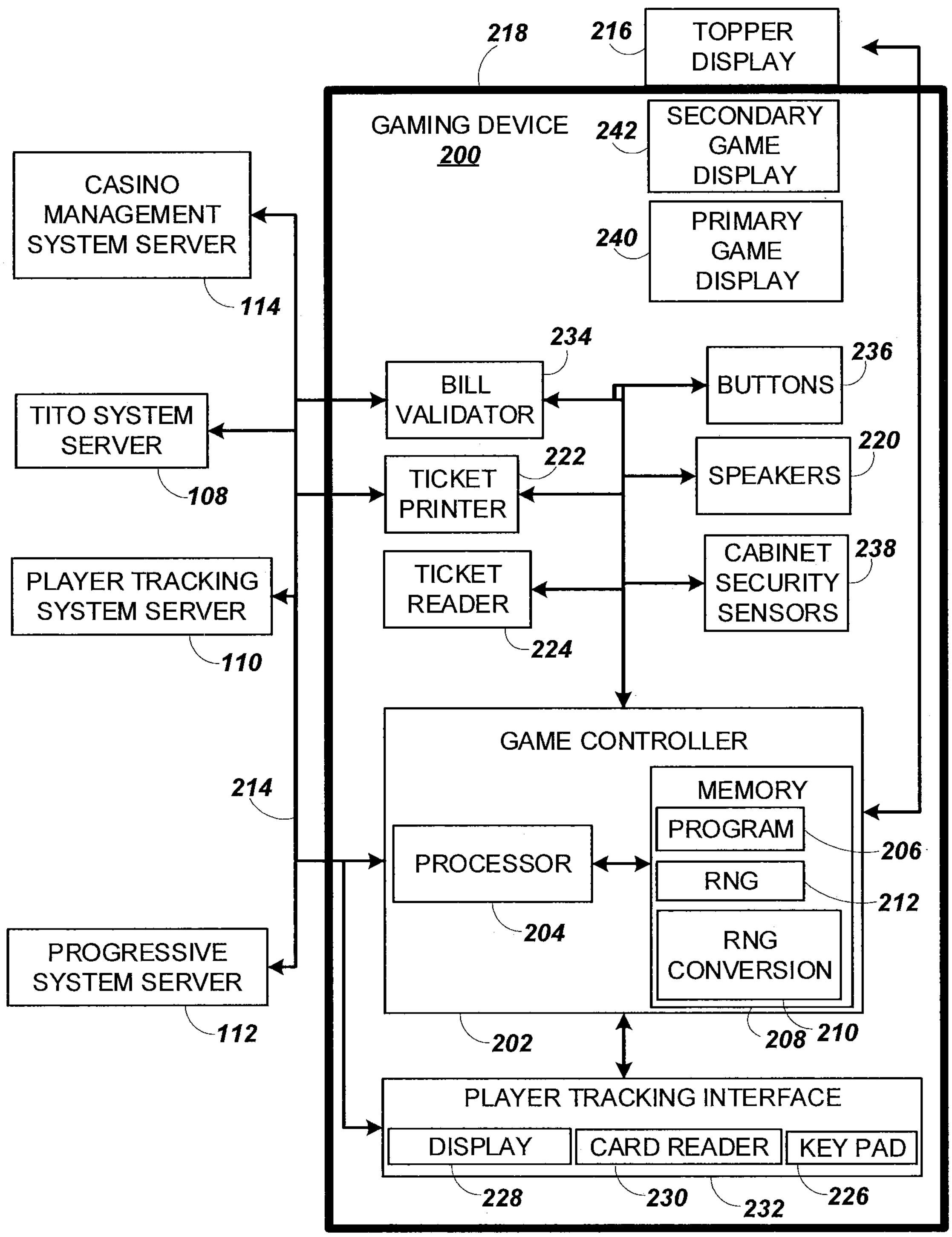
FIG. 2 is a block diagram showing various functional elements of an exemplary electronic gaming machine.

Many or all the above described components can be controlled by circuitry (e.g., a gaming controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more a game instances (e.g. a play or round of the game) may be generated onbased on instructions and/or data that gaming device 200 exchange with one or more a remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts In disclosed embodiments, a random number generator (RNG) 212 that can be implemented in hardware and/or software is typically used to generate random numbers that are used in the operation of game play to ensure that game play outcomes are random and meet regulations for a game of chance. Note that embodiments of the present disclosure represent an improvement in the art of EGM software and provide new technology in that they configured to generate and maintain multiple cumulative free games levels. Additionally or alternatively, in some examples the EGM employs one or more RNG 212 to determine when to provide an award (e.g. in response to a user input, such as wager selection), how to provide the award (e.g. via a trigger symbol, a wild symbol, in a particular reel, etc.), at what level (e.g. in the instance of a multi-level game, such as a multiple cumulative free games levels), at what amount (e.g. within each level), as well as other features associated with game play. In examples, a single RNG 212 can be employed for each of these decision points. In some examples, the RNG 212 corresponds to multiple RNGs, such that one or more RNGs can be assigned to different tasks, for instance, each decision point may be assigned a dedicated RNG. Further, one or more of the RNGs may operate with a common seed, each with a dedicated seed, or a combination thereof. Moreover, the assignment of RNGs to various tasks, as well as provision of seeds may be updated periodically and/or in response to a particular event (e.g., award of a maximum progressive jackpot). The application of RNGs, in particular a variety of RNGs with different seeds, may be assigned to different levels of the game.

In some examples, with the relevant RNG having output a determination to grant a cumulative free game, each cumulative free games play level may be applied to the spinning wheel feature and made available to the player providing the opportunity to increase the number of free games awarded. In this example, one of the cumulative free games available to the player may be granted to continued game play, further enhancing the gaming environment. Additionally or alternatively, one or more award multipliers and/or progressive jackpots can be associated with the free games, also by employing one or more RNGs, as disclosed herein. Such connected functionality requires new software and/or hardware to implement, such that these embodiments are thus not merely new game rules or simply a new display pattern.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touchscreen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain, be coupled to, or be replaced by a credit transceiver that supplies credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

As described with respect to the several figures, each gaming machine of a bank of electronic gaming machines (EGMs) is paired with a secondary display, to create a "duplicated display" such that events displayed on a player's EGM are replicated in real-time across the secondary display, a tertiary display, and/or set of displays. This duplicated display feature allows players to enjoy the displayed event in a personalized and accessible manner using the display of their slot machine and, at the same time, allows everyone around the player to share in the event via the secondary or tertiary displays.

Figure 3:
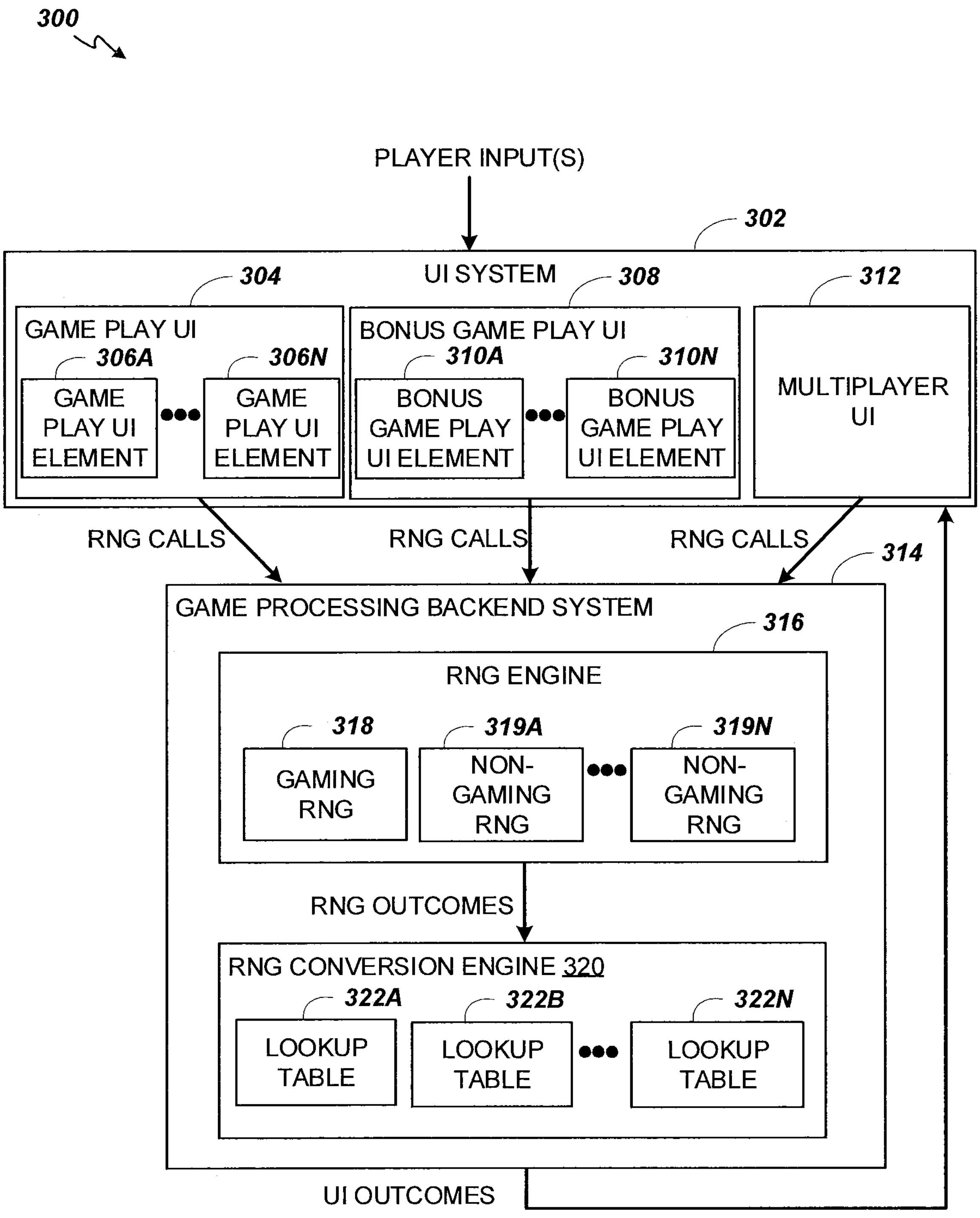
FIG. 3 illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 304, and one or more multiplayer UIs 306, where each UI type includes one or more mechanical UIs and/or graphical UIs (GUIs). In other words, game play UI 304, bonus game play UI 304, and the multiplayer UI 304 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from to the bonus game play UI elements 310A-310N.

FIG. 3 also illustrates that UI system 302 could include a multiplayer UI 312 purposed for game play that differ or is separate from the typical base game. For example, multiplayer UI 302 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for such as generating random messages that appear on the gaming device.

The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

In some examples, one or more inputs at the UI system 302 may trigger a RNG-translation process to determine one or more characteristics of a cumulative game feature. For example, a user input may initiate a RNG call, where the RNG engine 316 provides a RNG outcome from gaming RNG 318 to determine characteristics of a trigger and/or a trigger symbol from a lookup table 322A-322N. Thus, features of the cumulative free game, such as when a cumulative free game trigger hits, how it is presented, and/or characteristics of trigger symbols during play are determined and may be presented to the UI system 302, as disclosed with respect to FIG. 12.

Figure 12:
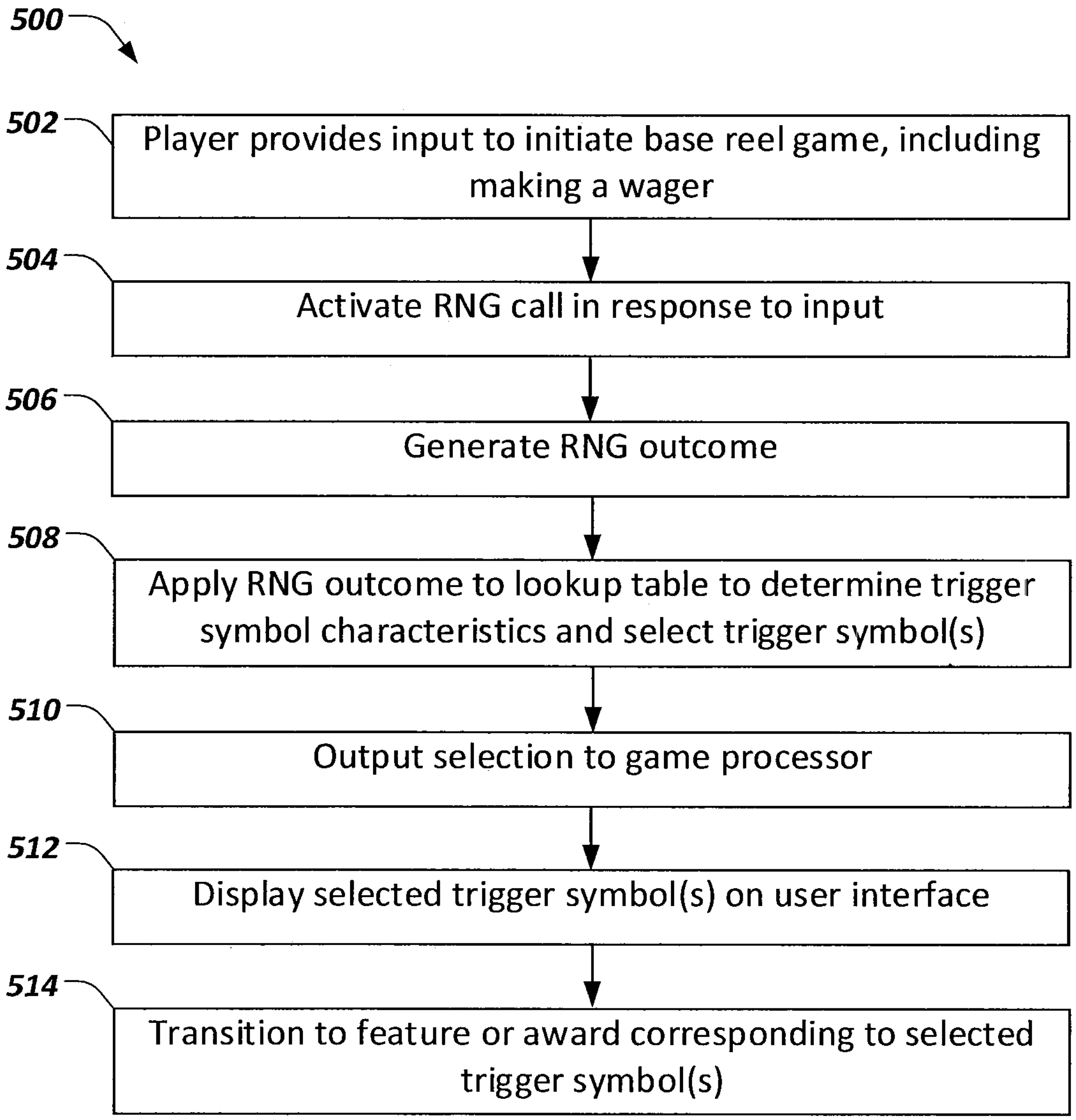
FIG. 12 is an example flowchart of a method of playing an interactive electronic gaming machine as disclosed with respect to FIGS. 1-11.

With reference to FIG. 12, in block 502, an input is received at the EGM (e.g., such as a wager, via the UI 302) to being gameplay. In block 504, one or more RNG calls can be activated. For example, the RNG call(s) can be associated with one or more game features or awards. In block 506, the RNG call(s) are processed via RNG engine 316 to generate one or more RNG outcomes. In block 508, the RNG outcomes are applied to one or more lookup tables to determine trigger characteristics. For example, the lookup tables may determine when a particular trigger symbol is presented, at which reel location, how many trigger symbols, visual characteristics of the trigger symbols, what response is prompted by the trigger symbols, etc., such that the one or more outcomes can correspond to a selection a particular trigger symbol or symbols, such as a cumulative free game trigger. For example, a single lookup table could be used to determine a color of the resulting symbol presented to the player (e.g. a green diamond lands on reel five).

Alternatively, two separate lookup tables could be used to determine the trigger symbols, such that one lookup table is used to determine the trigger symbol is a particular symbol (e.g. a diamond) and a second lookup table is used to determine characteristics of the symbol (e.g., color, size, etc.). In block 510, the results from the lookup tables are output to the EGM. Based on the presented outputs, the selected trigger symbol(s) are displayed on the UI in block 512. In response to the selected trigger symbol(s), the gameplay then transitions to reflect the features or awards prompted by the selected trigger symbol(s) in block 514

Figure 5:
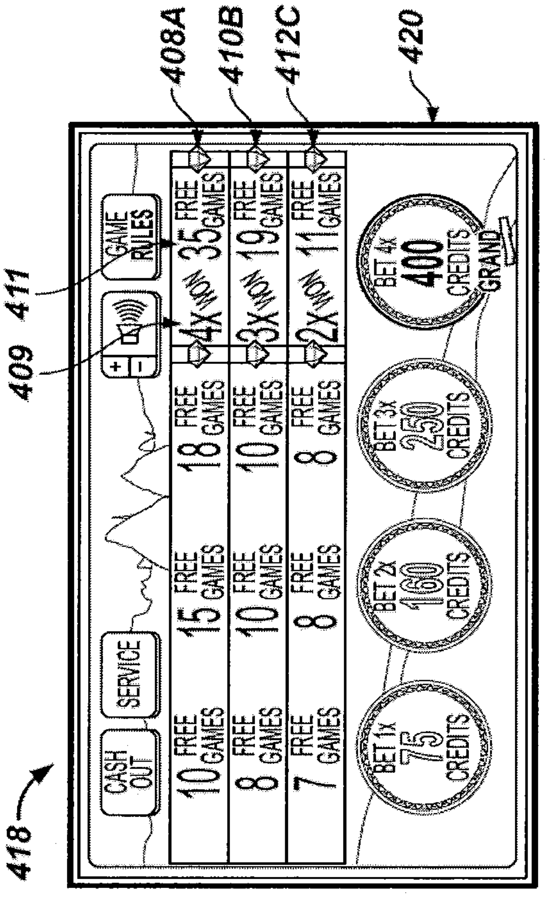
FIG. 5 illustrates an example of a secondary screen associated with the base game of FIGS. 4A-4C
Figure 6:
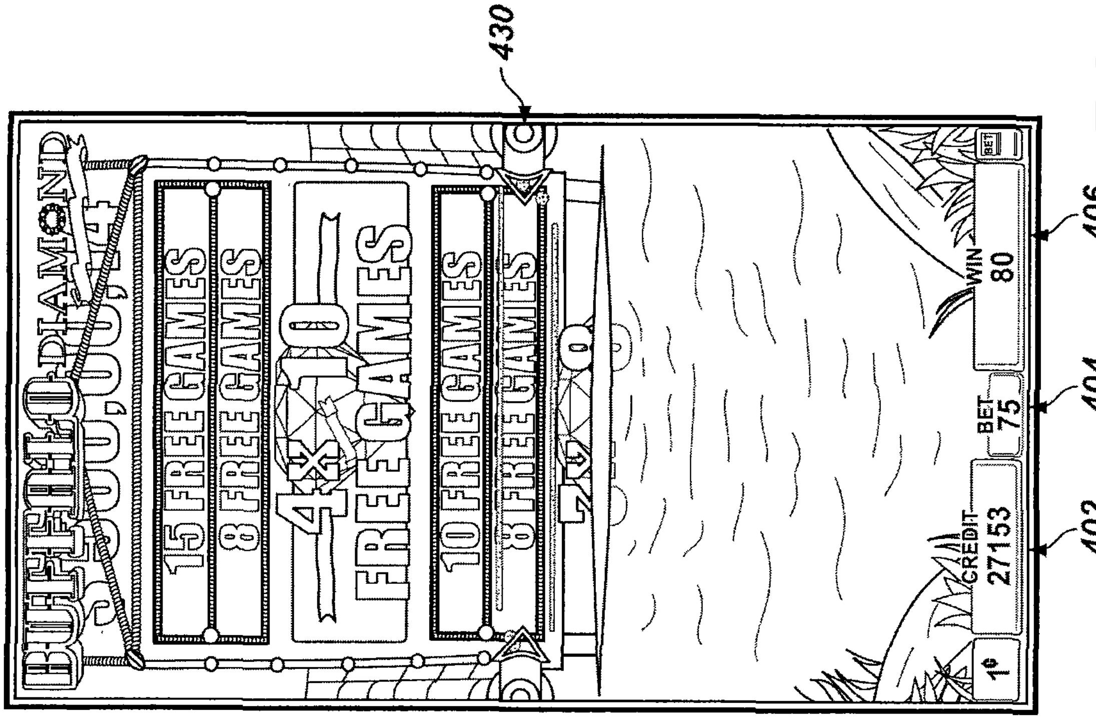
FIG. 6 illustrates an example spinning wheel feature associated with a non-cumulative free game win.

Systems, devices and methods for an interactive electronic reel game are disclosed. For instance, FIGS. 4 through 6 illustrate an example interactive electronic reel game operating on a gaming machine or device, such as gaming devices 104A-104X, that includes a game controller, such as game controller 202, configured to provide one or more reels presented on one or more displays. In disclosed examples, each EGM can incorporate various themes selected and/or animations to attract players (e.g., representing popular cultural references, natural themes, etc.). Further, a variety of stimuli can be employed in response to a trigger or outcome (e.g., a winning outcome), including visual, audible, haptic feedback, etc., to engage and inform the player.

Figure 4B:
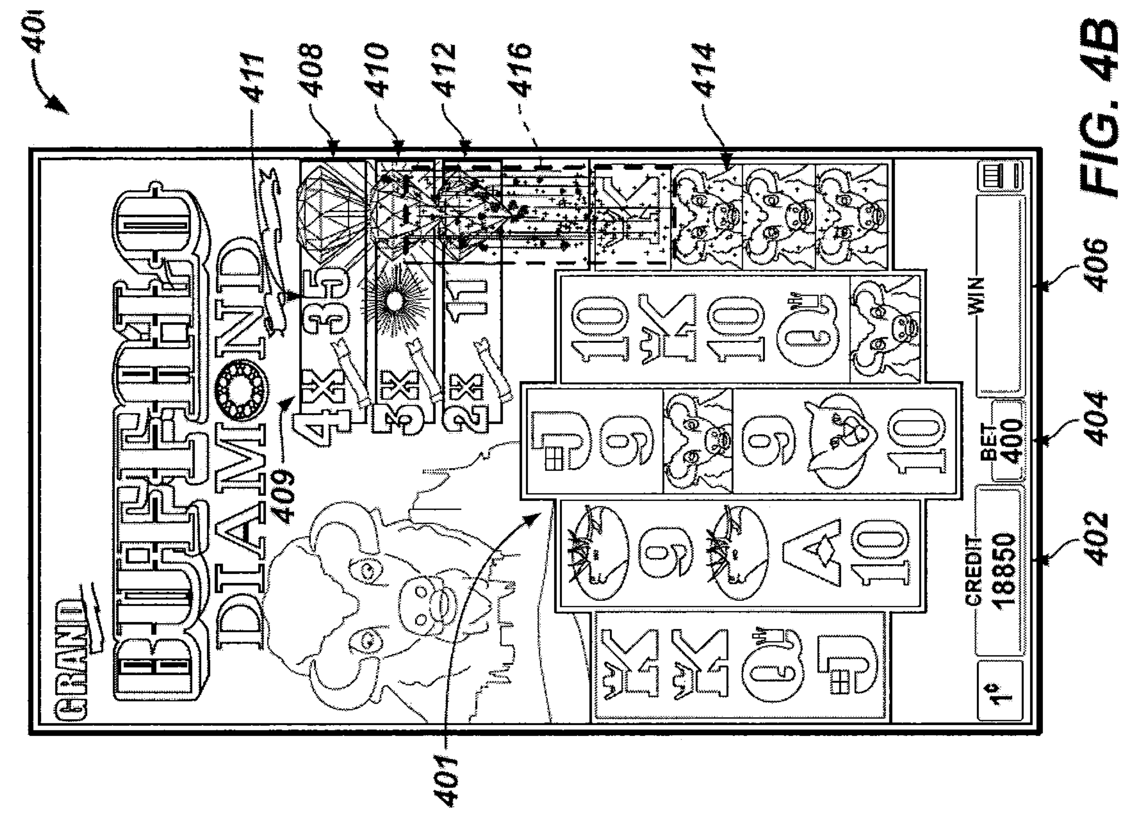
FIGS. 4A-4C illustrate an example display of a base game in accordance with the present disclosure.
Figure 4A:
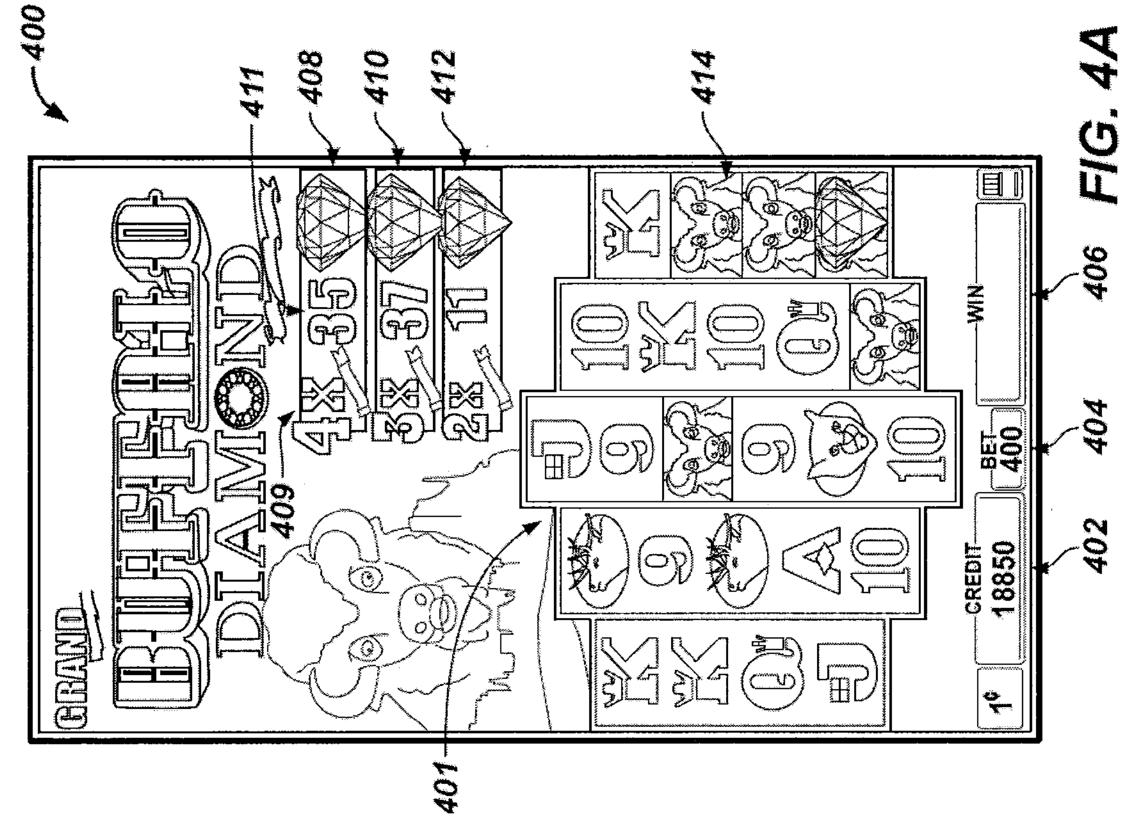
Figure 4C:
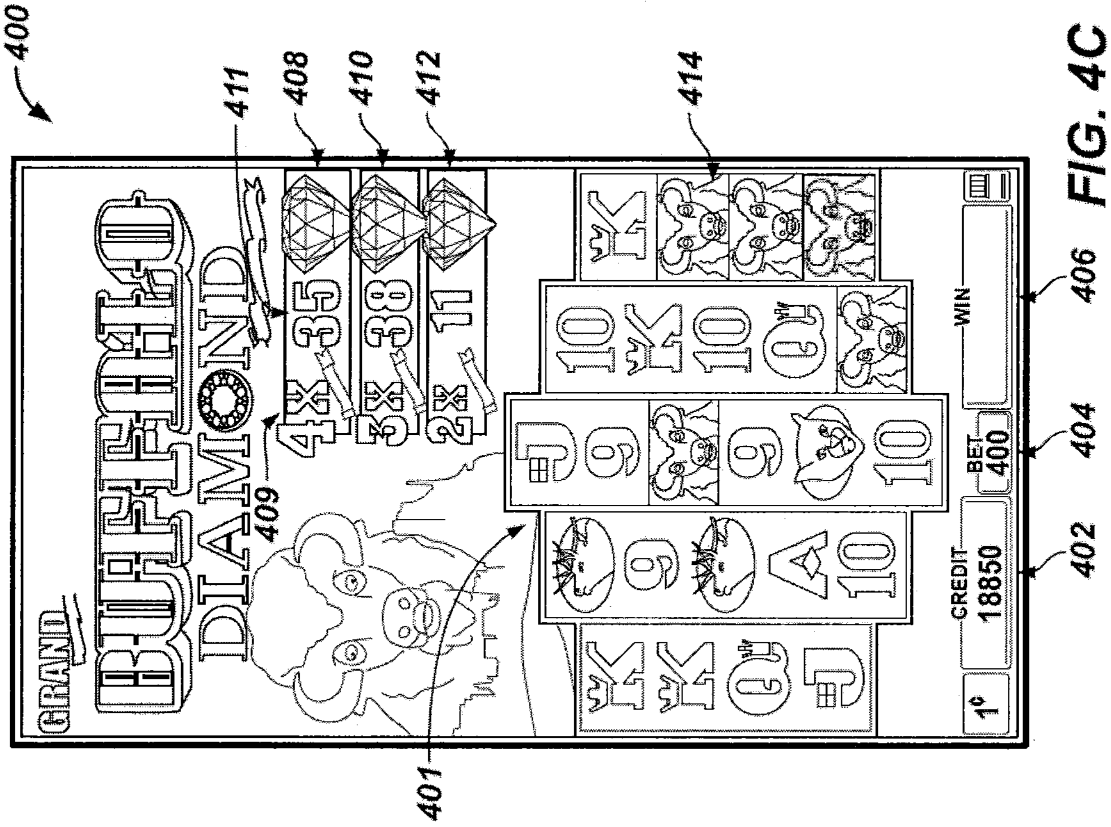

FIGS. 4A through 4C show an example base game on a display 400, featuring five vertically spinning reels 401. A number of cumulative free games play features are provided, with values and multipliers associated with each cumulative free games play feature in a cumulative free games meter 408, 410, and 412. During game play, the player can view a credit amount in credit meter 402, a bet amount in bet display 405, and a win amount in win meter 406. In some examples, the display 400 is a graphical user interface (GUI) operable to present information to the player as well as accept inputs from the player that impact gameplay. The GUI may present a range of denominations and/or wagering amounts, and provide an indication as to the changes in game operation in response to the selection. For instance, an increased wager increases the probability of hitting a higher multiplier. In response, the GUI can display one or more wager amounts, as well as an indication of a corresponding probability for receiving an increased award and/or other game feature. For example, a game feature can include opportunities for adding a cumulative free game, a non-cumulative free game, a bonus game, a multiplier, a wild symbol, a higher level of payout, or other desirable game features. An award can reflect game equity built during gameplay, an additional credit award, a jackpot award, for example. In other words, a first, lower wager amount may correspond to a lower probability of receiving an award, whereas a second, higher wager amount may correspond to a higher probability of receiving an award.

The cumulative free games meters, which are incremented in response to a trigger symbol (e.g., a particular symbol or symbols) being displayed in the reel-type game, can be incremented based on a base game wager and/or one or more outcomes, such as from a RNG call and/or associated with a lookup reference, to extend gameplay or add value to a possible award during the bonus round. In some examples, as the number of free games of each cumulative free game feature increases during play of the base game, the player's game equity may also increase, as both may increase during gameplay based on the trigger symbols and/or outcomes. For instance, during base game play, a predetermined trigger symbol (e.g., revealed within a reel) or an overlay of a predetermined trigger symbol may land on one or more displayed reels. Upon identification of the trigger symbol during the base game, a free game meter increases accordingly.

For example, the base game can be played with a number of reels (e.g., five reels arranged horizontally) on the main display. The reels may have a set number of symbol positions (e.g., four), or the number of symbol positions may vary. In the example of FIG. 4A, the first and fifth reels have four symbol positions each, the second and fourth reels have five symbol positions, and the third and central reel has six symbol positions, although any variation on the number and/or arrangement of reel and/or symbol positions is contemplated. FIG. 4A illustrates a trigger symbol (e.g., a diamond symbol) on the fifth reel, however, the trigger may be displayed on another reel, on a combination of reels, and/or on another portion of the display screen 400. The diamond trigger symbol may provide a visual and/or audible transition to a corresponding free games meter, and thereby prompt an increase in cumulative free games meter 410, as shown in FIG. 4C. In some examples, a smaller or greater number of trigger symbols may be selected. Additionally or alternatively, the trigger symbol(s) may land on any of the reels in play. The type of trigger, number of trigger symbols required to prompt a response, the symbol to be presented, the value of the selected trigger symbol, and/or the particular response to the trigger, may be predetermined, generated randomly (e.g., via an RNG call and associated lookup), or a combination of predetermined information and randomly generated outcomes.

In addition to cumulative free games, regular free games (e.g., non-cumulative) can be granted in response to pairings of scatter symbols while in a bonus feature. For example, two or more predetermined symbols (e.g., a coin, buffalo, eagle, cougar, elk, or other shape/picture) may reward the player with additional free games. In some examples, pairing two scatter symbols grants five additional free games, matching three scatter symbols grants eight additional free games, four scatter symbols grants fifteen additional free games, and whereas five scatter symbols grants twenty additional free games. During play of a free game, a wild symbol that lands on the screen may reveal a randomly determined multiplier with the multiplier value (e.g., 2×, 3×, etc.) based on a weighted table and/or an output from an RNG.

In some examples, one or more distinct levels of cumulative free games play features are available to the player, each with unique trigger symbols (e.g., a first trigger symbol, a second trigger symbol, etc.). Thus, each cumulative level in a respective cumulative free games meter will reflect the incremented number of free games in response to a particular trigger symbol and/or combination of trigger symbols landing on one or more displayed reels. In some examples, one or more trigger symbols landing on the displayed reels may directly correspond to a particular cumulative free games meter. In examples, one or more combinations of the trigger symbols may correspond to one or more cumulative free games meters, and/or one or more numbers for a corresponding cumulative free games meter. For example, the trigger symbol(s) and/or number of free games associated with a particular cumulative free game level and/or feature may be determined by one or more RNGs, such as a dedicated RNG for one or more cumulative free game levels, as disclosed herein.

For example, each cumulative free games meter 408-412 may be displayed with one or more distinguishing characteristics. For instance, a particular color, animation, symbol, theme, audible alert, and/or other distinguishing characteristic may be presented to the player when a trigger symbol for a respective free games meter lands on the screen, such as on a stopped reel following a reel spin. In some examples, two or more such cumulative free games meters 408-412 will be displayed, be it continuously (e.g. during each phase of game play), simultaneously following a reel stop, and/or in succession. For instance, a particular reel may display trigger symbols associated with two or more cumulative free games meters 408-412, and any changes may be displayed in the respective free games meters. In other examples, a free games meter is only displayed in response to an associated trigger symbol being presented.

In some examples, animation is provided to indicate that a particular cumulative free games meter 408-412 is being increased, as shown in FIG. 4B. In the example of FIGS. 4A to 4C, three cumulative free games meters 408-412 are visible to the player, which allows the player to visualize game progress as game equity increases during gameplay. When the free games are applied to the respective cumulative free games meter, the number of free games will update accordingly, which is presented on the screen at the time of the update, providing a simple graphical representation of the process as shown in FIG. 4C. The arrangement and visualization of the process enhances a players understanding of the associated game mechanics and enjoyment of the game. As shown in FIG. 4A, a top cumulative free games meter 408 displays thirty-five cumulative free games in a column 411, a central cumulative free games meter 410 display thirty seven cumulative free games in column 411, and a bottom cumulative free games meter 412 displays eleven free games in column 411. In response to the trigger symbol, animation 416 shown in FIG. 4B actively adjusts the number of cumulative free games in column 411 of the central cumulative free games meter 410. In this example, a probability of being granted a cumulative free game may be determined by an RNG output and/or by reference to one or more lookup tables. Thus, an RNG outcome (and/or lookup table value) may correspond to the particular trigger symbol associated with a specific cumulative free games meter 408-412, and/or to the number of free games added to the specific cumulative free games meter.

In the example of FIG. 4B, a visual of a trigger symbol, such as a diamond, transitions from reel five into the central cumulative free games meter 410. The particular animation can be selected to distinguish the corresponding triggered cumulative free games meter, including a color code (e.g. purple, blue, green, etc.), size of the symbol (including a dynamic or change in size), shape of the symbol (e.g. diamond or other geometric, symbol, graphic, etc.), a particular theme (e.g. wispy lines, appearance of water, flames, etc.), speed of movement, transparency of the animation, associated symbols (e.g., shapes, pictures, numbers, etc.), to name but a few. These particular characteristics may uniquely correspond to a given cumulative free games meter. Additionally or alternatively, following transition from the reel to the cumulative free games meter 410, the trigger symbol (e.g., the diamond) disappears, where a new symbol replaces the trigger symbol on the reel. In the example of FIG. 4C, the trigger symbol is replaced by a buffalo symbol, however one or more other symbols may be presented. In some instances, the type of symbol(s) that replace the trigger symbol could be presented as a static image or a dynamically changing symbol (with visual effects, change in symbol during gameplay, etc.).

In the example of FIG. 4A, a feature is generated (e.g., a symbol such as a diamond) in response to a trigger symbol or symbols landing on a reel or reels. In the example of FIG. 4A, three buffalo symbols land on reel five, as the game controller generates a trigger symbol as a blue diamond corresponding to cumulative free game meter 410, which appears on the far right hand side of display 400. Although in this example a diamond serves as a trigger symbol for a cumulative free game, other symbols and or combination of symbols may serve as a trigger for one or more cumulative free games and corresponding cumulative free game meters. The particular cumulative free game selected in response to the trigger is then incremented, as shown in the corresponding cumulative free games meter 410. The particular cumulative free game may be selected based on one or more conditions. For example, each bet or wager amount may correspond to a specific one or more of the cumulative free games meters 408-412. For example, all available and/or initiated wager levels may be displayed on display 400 (along with the base game) and/or a supplemental screen. The current wager level may be shown in bet display 404, and/or on an elevated display screen above the reels of the base game, such as shown in FIG. 5.

In some examples, the trigger may be associated with an RNG outcome, which may be identified from one or more lookup tables, as disclosed with respect to FIG. 2. Based on the trigger, is activated in response to identified trigger, a symbol or symbols corresponding to the trigger is displayed on a stopped reel, as shown in FIG. 2. The resulting number outcome generated through the RNG may correspond to one or more responses. For example, the number can activate a particular cumulative free game, such as cumulative free game with a 3× multiplier, as shown in cumulative free games meter 410. In the example of cumulative free games meter 410, one or more effects are initiated (e.g. change in color, brightness, animations, sound, vibration, etc.) to illustrate the resulting increase in cumulative free games. As shown, the diamond in cumulative free games meter 410 is illuminated, and animated effects indicate a change in display corresponding to the number of free games granted.

In an embodiment, during play of the base game, when the trigger symbol animates, and transitions to increment the corresponding cumulative free games meter, it reveals an overlaid base game symbol, which may be used in determining any base game awards, such as any base game winning symbol combinations.

During play of the base game, a trigger symbol corresponds to one or more dynamic symbols that are replaced every spin, and will visually appear on the reels as a trigger symbol(s) for a selected cumulative free games play feature level (a first, second, or third level, as shown in FIGS. 4A-4C) based on a wagered amount, a weighted table, or other selection mechanism. In an example, an output from a RNG corresponding to the base game and/or trigger symbol(s) is generated using an internal seed value. The RNG outcome is then mapped to a lookup table to determine the symbol that is selected and/or displayed. In one implementation, the lookup table could be the reel strip itself. In some examples, only one type of level trigger symbol is available for presentment per wagered spin. When a trigger symbol(s) lands at the reel stop, the corresponding level cumulative free games meter 408-412 will increment by one for every respective trigger symbol that landed.

For example, when a trigger symbol lands, the animation and/or sound will highlight the presentation of the symbol. As shown in FIG. 4B, animation 416 will visualize selection of the corresponding meter level (sequentially from top to bottom), and the meter itself animates to show the incremented free games count.

In some examples, the player may increase a wager prior to initiating the base game, thereby increasing the probability of granting a free game to one or more of the cumulative free games levels. In some examples, the increased wager will decrease or eliminate grant of a regular, e.g., non-cumulative, free games feature. Additionally, in accordance with an increased wager, each cumulative free games play feature level has an increased startup value for the number of free games granted with the multiplier at that level.

In some examples, one or more symbols or combination of symbols can trigger one or more bonus features, such as an alternative game, expanded functionality, etc. The bonus feature, as well as the symbols that trigger the bonus feature, may be linked with or independent of the cumulative free game trigger symbols disclosed herein.

Available to players during game play are various multipliers, which may increase in value incrementally, by random values output from an RNG, predetermined values, and/or based on a wager amount.

In some examples, progressive jackpot awards are available for award on an EGM, such as stand-alone, single EGM progressives or shared progressives e.g., single site progressives (SSP), or multi-site progressives (MSP) may be employed, with multiple EGMs communicating via a network to reflect a shared progressive award. In some examples, fixed jackpot awards are also available and may vary, according to a player's bet level. Additionally, a players eligibility to win a jackpot can vary based on a players bet level, for example, a player may be eligible to only win a Mini jackpot at the minimum bet level, a Mini and a Minor jackpot at a middle bet level, and a Major (e.g., Grand) jackpot at a maximum bet level. In some examples, a player may achieve a level of play that rewards the player with all or a portion of a jackpot. The amount of the jackpot may be determined by bet level and/or cumulative earnings during gameplay, which may include the player's wagered amount. Thus, in the event the player is provided with a jackpot payout, it may all or a portion of the player's wagered amount and/or the earnings accumulated during gameplay.

Moreover, values of awards and access to different levels of progressive jackpots can be based on different wager levels and/or denominations at wagering, such as a 1 cent play as shown in credit meter 402. For example, as denominations increase, (e.g. from 1 cent to $50 or more), the number of progressive levels available to a player may also increase, and/or the amount of one or more jackpot associated with each progressive game may increase. In some examples, by increasing one or both of the bet level or the denomination, a number of cumulative free games and/or a level of the cumulative free games available to the player also increases. This increase in availability may also stem from an increased probability that a trigger will be presented following a spin, and/or that a multiplier will be applied to the award. As a result, a greater number of free games can be granted during play, as well as a higher cumulative free game level and/or the associated multiplier for all wins during play of the granted free games.

With reference to the present disclosure, the wheel spin feature provides the player with multiple levels of cumulative free games play features. The number of cumulative free games play features that may be placed on the wheel spin feature, and thus available to win during play of the wheel spin feature, may be based on the amount of a wager by a player. In some embodiments, when a maximum wager is made by the player, a single position on the wheel of the spinning wheel feature contains a jackpot award, e.g., a grand jackpot award, and all remaining positions contain a plurality of cumulative free games play features, thus providing a certainty that the player will be granted a grand jackpot, or one of the plurality of free games play features. Further, in an embodiment, when less than a maximum wager is made by the player, a jackpot award may be removed from a position on the wheel of the spinning wheel feature or remain in the position but "crossed off" and thus not available to be granted to the player. Additionally, in some embodiments, when less than a maximum wager is made by the player one or more fixed free games play features may be placed on the wheel, reducing the number, e.g., one or all, of the cumulative free games play features available to be granted to the player and thus reducing the probability the player will be granted a cumulative free games feature.

In the example of FIGS. 4A-4C, three levels of cumulative free games meters are shown (e.g., a Buffalo Diamond base game with three levels of cumulative free games meters) with an associated multiplier. As shown, the top cumulative free games meter 408 provides a 4× multiplier in column 409, colored purple. The central cumulative free games meter 410 provides a 3× multiplier in column 409, colored blue. The bottom cumulative free games meter 412 provides a 2× multiplier in column 409, colored green. During game play, one or more WILD symbols may substitute for any or all symbols. In some examples, scatter symbols are not available for WILD substitution.

In the example of FIG. 5 four bet amounts (e.g., 75, 160, 250 and 400 credits) are provided in section 420 of display 418, each bet with a respective set of three levels of cumulative free games meters, each level of cumulative free games having an associated multiplier (e.g., 2×, 3×, 4×). In some examples, a probability for hitting a multiplier is different for different multipliers. For instance, the probability of hitting a 4× multiplier is lower than 3×, which has a lower probability than hitting a 2× multiplier. In some examples, a particular probability is generated via an RNG outcome and corresponding lookup table, as disclosed with respect to FIG. 2. However, due to the lower multiplier to any associated payout amount, the payout for a 2× available award could be lower than the payout for a 3×, or 4×, multiplier for a particular portion of the game, even as the probability of hitting a 2× multiplier is greater. The probability of hitting any multiplier may be further determined by an output from an RNG and/or by reference to one or more lookup tables. These techniques increase the level of volatility during gameplay while maintaining a certain level of RTP.

Figure 7:
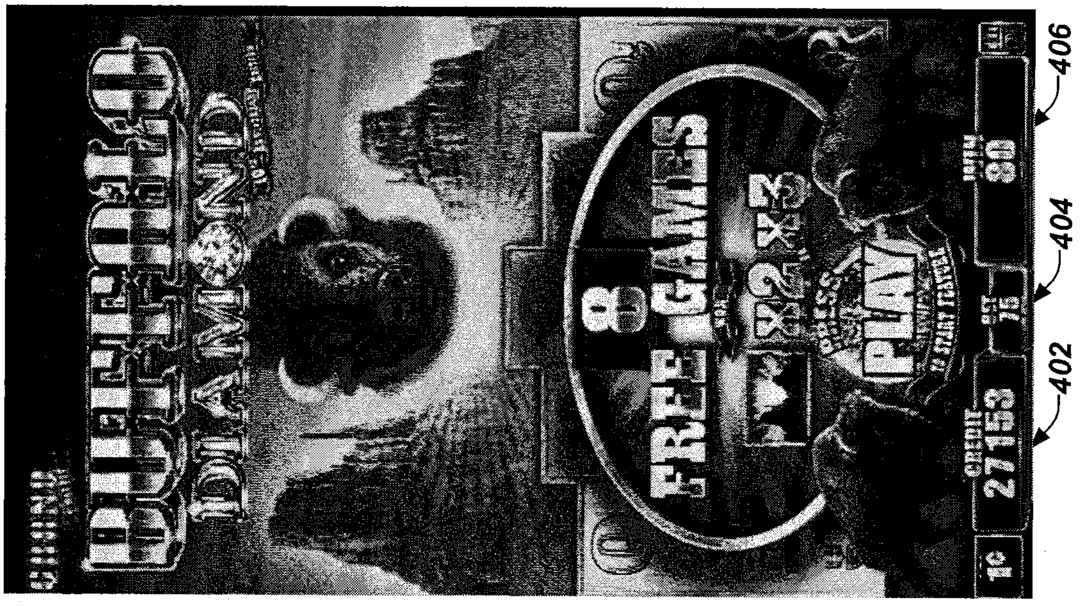
FIG. 7 illustrates an example summary display associated with a selection of the non-cumulative free game of FIG. 6.
Figure 9:
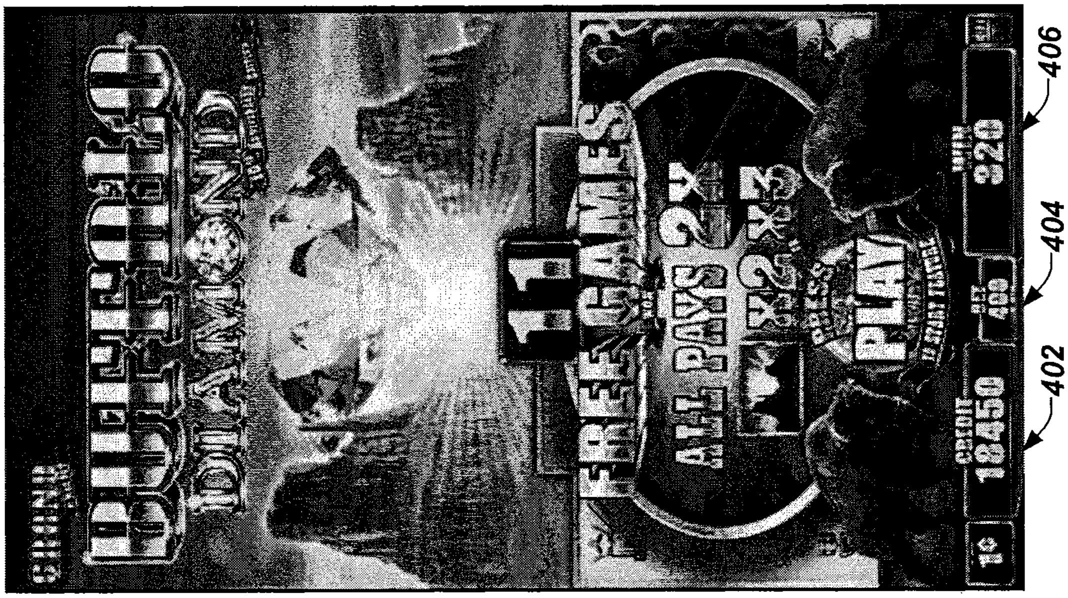
FIG. 9 illustrates an example summary display associated with a selection of the cumulative free game of FIG. 8.

There are three levels of cumulative free games meters for each bet level and a plurality of levels of regular free games (e.g., 10, 15, 20, 25, 50, etc.). Each bet level has its own initial number of cumulative free games on its cumulative free games meters. Each bet level has its own set of cumulative free games play features that are independent of other bet levels, e.g. each bet level has its own set of cumulative free games meters. Cumulative free games multipliers apply to all wins for those free games. Cumulative free games wins are multiplied by their respective multipliers as well as by the bet level multiplier. Regular free games are multiplied by the bet level multiplier only. Each free games play feature level is displayed with a differentiated background during play of the free games. For example, the regular free games play feature level shown in FIG. 7 shows a particular background (e.g., a buffalo), and may have particular animations, sound, etc. By contrast, a green diamond cumulative free games play feature level shown in FIG. 9 illustrates a green diamond background cumulative free games play display, with specific coloring, etc.

In an example, if a cumulative free games meter increments beyond a threshold value for that meter, then the meter will play a unique animation to alert the player. Such animation will play continually until the meter resets. One or more of the cumulative free games meters may respond with this animation, even if the particular free games meter has not exceeded a threshold value. In some examples, the threshold value corresponds to a payout value, where the game machine provides a payout award to the player and resets the free game meter to a starting level, such as a minimal level (e.g. a base value, zero, etc.).

In one or more examples, a symbol or group of symbols (e.g., three or more coins symbols, etc.) can trigger a transitional feature, such as the wheel gateway feature. Trigger symbols can be displayed on any or all of the available reels and trigger the transitional feature. The transitional feature may be a reel game or the wheel gateway feature. In some examples, the wheel gateway feature may be included with a plurality of reels provided in the reel game (e.g. vertically and/or horizontally spinning reels, such as a reel-power game). For example, upon presentment of the trigger symbol(s) and selection of the wheel gateway feature, the wheel gateway feature initiates a transition to the spinning wheel feature, which indicates the level of free games, or the number of free games for play in the free games feature bonus, granted to the player.

In examples, the wheel gateway feature may be displayed as an overlay to one or more of the reels present in the base game. For instance, one or more trigger symbols may be displayed within the reels of the base game, and the wheel gateway feature operation is initiated in response, such as to provide a visual, audible, and/or haptic alert to the player that the wheel gateway feature has been initiated.

As shown in FIG. 6, once invoked, the wheel gateway feature transitions the main screen from the reel game to a spinning "wheel" containing a plurality of free game options that include regular (e.g. non-cumulative, non-multiplied) free games, cumulative free games with associated multiplier, and a grand progressive bonus or other jackpot bonus type award. As disclosed herein, the wheel gateway feature can be triggered by a trigger symbol(s) 414, such as a wheel bonus symbol, several matched symbols in a particular arrangement, or other symbols (e.g., a diamond, three buffalo symbols, etc.) displayed on the fifth reel upon stopping the spinning reel game. However, the trigger symbols may be distributed across several reels, contained in a single reel, be the same symbol, or be a predetermined combination of similar or different symbols. In response, the wheel gateway feature is triggered, accompanied by one or more animations, as well. In some examples, a separate RNG call is used to spin the wheel gateway feature in response to presentation of a trigger symbol(s). A separate lookup table could be used to determine the outcome of the wheel gateway feature. Additionally or alternatively, although illustrated in FIG. 6 as a spinning wheel feature, additional or alternative features may be used. For example, the feature may execute as a reel spin or other suitable game, such as within a symbol matrix.

During the spinning wheel feature, the wheel spins vertically until it comes to a stop, with the selected free games play or jackpot award being displayed between pointer elements 430. In the example of FIG. 6, the wheel provides the appearance of rolling through water, however other animations and/or themes are also considered. In some example wheel spins, the grand or jackpot award is made available regardless of bet level selected by the player. However, there may be bet levels where the player is not eligible to win the grand or jackpot award, and the award will appear as inactive, but still spin on the wheel with the other features, e.g., the free games play feature.

The features granted in response to the spinning wheel feature awards will show information regarding each feature, such as the number of free games play and corresponding multiplier award for cumulative free games play features. For the cumulative free games play features, the cumulative free games multipliers may be the same across all bet levels, and the bet level multiplier is then applied on top of the cumulative free games multiplier. The free games may provide extra multipliers for granted free game during the play of the free game. In some examples, the player cannot be granted additional multipliers during play of a free game.

In some embodiments, additional free games may be granted during the play of the free games. In an example, if two triggering symbols (e.g., coins) land on the stopped reels during the play of a free game, five additional free games may be granted. Further, in an embodiment, a retrigger of the spinning wheel feature may occur during the play of the free games, which may result in the grant of another standard or cumulative free games play feature, which may be played during or following play of the current free games. Additionally, in some embodiments, another free games play feature (e.g., a standard or a cumulative free games play feature) may be granted, for example, with the landing of one or more trigger symbols (e.g., coins, diamonds, etc.) on the stopped reels during the play of the free games.

The appearance of additional scattered buffalo symbols on the screen (e.g., reels three and four) will provide the player with higher pay outs, however, the feature is triggered and continues regardless of additional scattered symbols. In this example, any winnings from play of the base game are to be paid before the display transitions to the spinning wheel feature, as shown in FIG. 6.

In response to the trigger of the wheel gateway feature, the based game transitions to the spinning wheel feature and displays the spinning wheel of FIG. 6. In some examples, the spinning wheel covers a majority of the display, either as a replacement for the base game visuals and/or as an overlay. As the spinning wheel spins, various features and/or awards are offered to the player. Once a feature or an award is selected upon stopping the wheel (e.g., randomly or in response to a player input), identified between pointer elements 430, the spinning wheel feature ends and the game transitions to a granted free games play feature, or awards a grand jackpot, or other jackpot bonus award. As shown in FIG. 7, an informational graphic can be displayed upon selection of a granted free game play, which summarizes the number of free games granted, if a multiplier is applied, etc.

Figure 8:
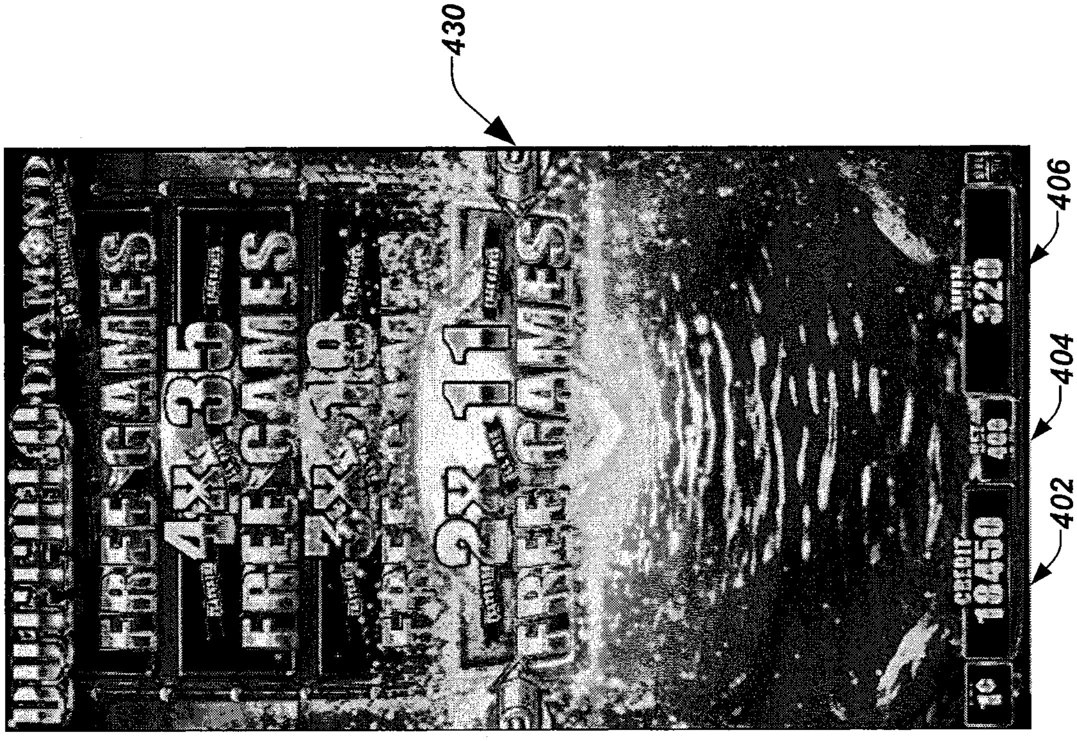
FIG. 8 illustrates an example spinning wheel feature associated with a cumulative free game win.

FIG. 8 shows another example spinning wheel feature, where a cumulative free games meter has been selected. Selection of a cumulative free games meter award is accompanied by particular animation, sound, visuals, etc., to engage and excite the player. Further, the informational graphic displayed in response, as shown in FIG. 9, identifies the number of free games granted, as well as the multiplier (e.g. "ALL PAYS 2×").

Figure 10:
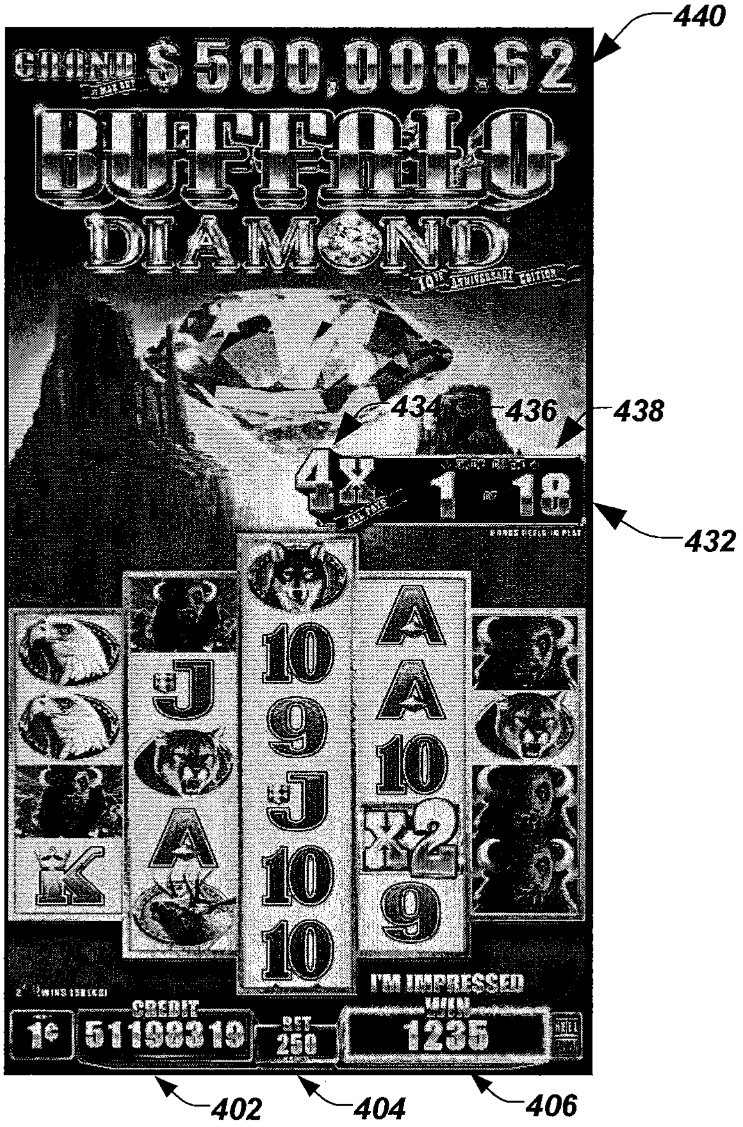
FIG. 10 illustrates an example display of a free game play based on a selection from the spinning wheel feature.

Following display of the informational graphic (e.g., as shown in FIGS. 7 and 9), the game transitions to play of a free games feature associated with the selection. For instance, FIG. 10 illustrates an example display of a free game play based on selection from the spinning wheel feature. A free game counter 432 provides information for the player associated with the selected free game, such as the multiplier 434 being applied to a win during play of the free game, a number of free games used 436, and a total number of free games available 438. As shown in FIG. 10, the selected free game is a cumulative free game with a 4× multiplier for all pays, corresponding to the top cumulative free games meter 408. In addition to the particular multiplier, the free game type (e.g. non-cumulative, a particular level of cumulative free game) can be identified by various characteristics, such as a corresponding background color (e.g., a purple, blue, or green hue), display of a corresponding symbol (e.g., a diamond), text, animation, sound, or other elements to inform and/or engage the player. Further, an available jackpot 440 is also displayed, such as in response to a particular wager and/or result from a reel spin.

Figure 11:
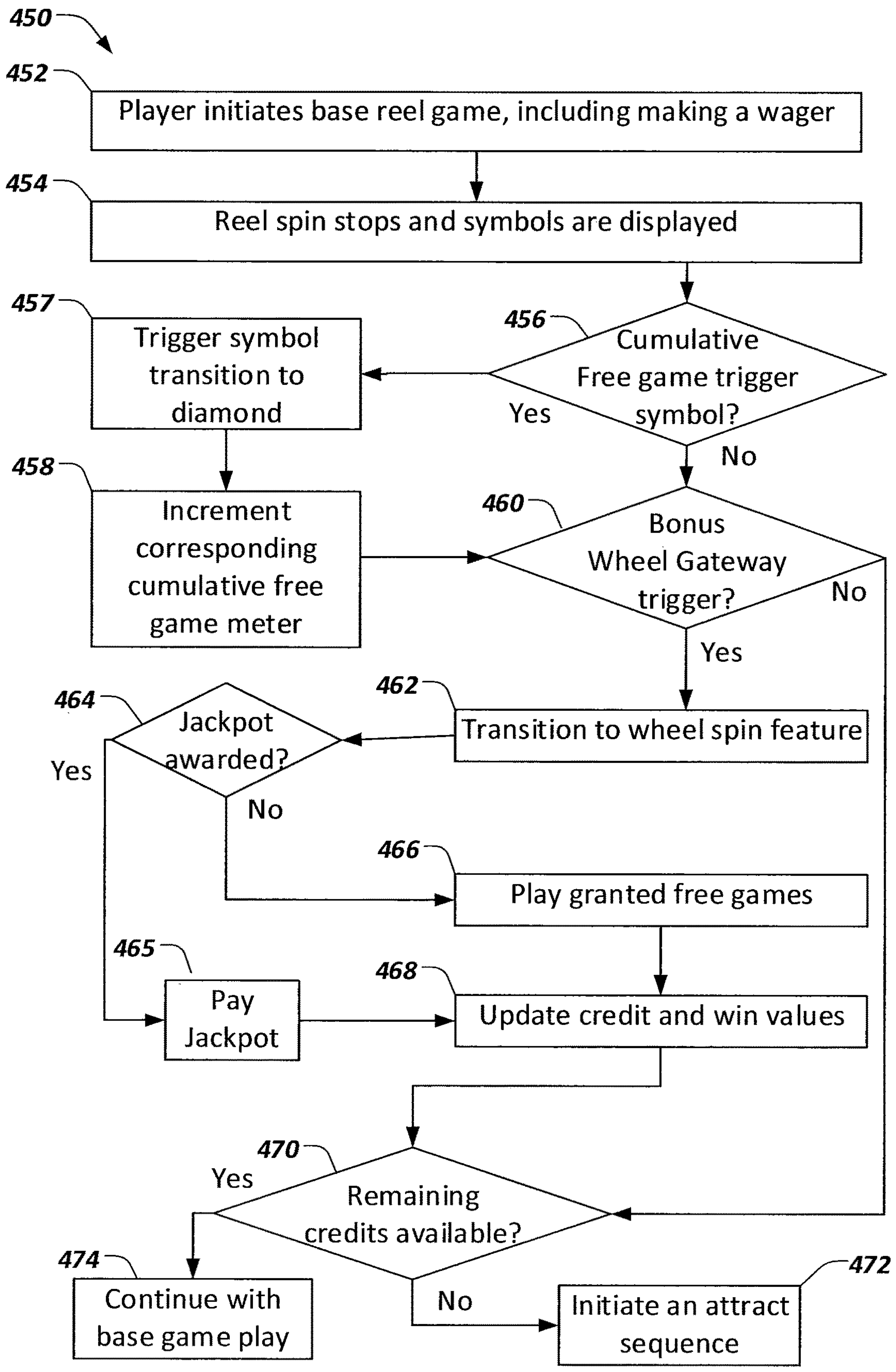
FIG. 11 is an example flowchart of a method of playing an interactive electronic gaming machine as disclosed with respect to FIGS. 1-10.

FIG. 11 illustrates a method 450 of playing an interactive electronic gaming machine configured to increment a plurality of cumulative games in response to a cumulative free game trigger, and initiate a wheel spin feature to select a free games play feature, consistent with one or more examples provided herein. The method 450 can be executed as instructions or algorithms including one or more RNGs (e.g., RNG 212), stored on one or more memory devices (e.g., memory 208), and executed via one or more game controllers and/or central controller (e.g., game controller 202, via one or more processors 204), as provided with respect to FIG. 2.

In block 452, a player initiates a base game, including two or more spinning reels. For example, a player is invited to deposits money, credits and/or tickets to add value to a credit meter, as an introductory video and/or audio sequence commences. The player selects a wager amount, and the base game begins when initiated by the player. As the game proceeds, the credit meter decreases each time a wager is placed.

In some examples, the base game is an electronic casino game, such as a reel power type game. The base game provides a user interface (e.g., a GUI), such as a touchscreen display, with various controls to interact with the game. For example, a play button allows the player to start and/or stop one or more reels. A cash out button allows a player to print receipt tickets (e.g. upon completion of play). The player may be prompted to spin the wheel, such as by touching a spin icon on the screen, or by using a physical spin button.

As disclosed herein, the one or more cumulative free games meters show the various number of available free games in each level, and/or each wagering level associated with the level. However, the cumulative free games meter and the values/wagers associated with them may have no effect on play of the base game.

Wagering options can be presented in various configurations and or amounts, as shown in bet display 404. The amounts can include a variety of credits based on the bet multiplier, such as 75 credits ×1 bet; 160 credits ×2 bet; 250 credits ×3 bet; 400 credits ×4 bet; 600 credits ×6 bet.

In block 454, the reels stop spinning and the various symbols are displayed. For example, during play of the base game, the player may force one or more of the reels to stop at by interacting with the interface. The reels may also stop after a predetermined amount of time, randomly, or in response to another action.

After the reels come to a stop and the displayed symbols are analyzed, if there are no wins granted, the game play ends. If, however, it is determined in block 456 that a cumulative free game trigger symbol(s) is presented, the cumulative free game trigger symbol(s) transition to a representation of a feature associated with the corresponding cumulative free game meter in block 457. For example, if a symbol corresponding to a cumulative free game trigger is displayed on the reel, a visual and/or other effect can be presented to illustrate the transition from the displayed trigger symbols to a cumulative free game, as shown in FIG. 4B. In some examples, the feature highlights a symbol (e.g. a diamond) associated with the corresponding cumulative free game meter, providing visual confirmation that the presented cumulative free game trigger symbol(s) result in a grant of the particular cumulative free game. Having been identified based on the transition, the corresponding cumulative free games meter is incremented in block 458.

If there are one or more wins, the total of the wins will show in the win meter 406 and the credit meter 402 will increase by the amount shown in the win meter 406. Further, as the reels land, anticipation animation will occur if two scatter symbols are displayed and there is still a chance to land a third, fourth, etc. Landing of scatter symbols will come with some smart animation, regardless of order.

In cases where either a cumulative free games trigger is or is not present, block 460 determines whether the displayed symbols indicate a bonus wheel gateway feature is triggered. For example, when three or more symbols land in a particular set of reels (e.g., reels one, two and three), the wheel gateway feature transitions the game to the spinning wheel feature display.

If a bonus wheel gateway trigger (e.g., one or more trigger symbols) has landed, the base game will pause and transition to the wheel spin feature in block 462 (see, e.g., FIGS. 6 and 8). For example, a RNG call (and associated lookup) can determine a probability that a particular trigger symbol will land to prompt a game response, including a wheel gateway feature or an award. When the wheel spin lands, it is determined whether a feature or an award is selected. In block 464, the game determines if a jackpot has been awarded. If a jackpot has been awarded, the game proceeds to pay the jackpot in block 465. If a jackpot has not been awarded, the game then proceeds to play the granted free games in block 466. During play of the free games, the number of available free games is displayed, as well as the number of free games played. Additionally or alternatively, the player is presented with a possible jackpot award amount (e.g. based on a particular wager amount), and a multiplier for each win, if a cumulative free game was selected during the wheel spin feature.

Following play of the granted free games in block 466 and/or the award of a jackpot in block 465, the game progresses to update the credit and/or win values in block 468. For example, after the wheel spin feature and play of the free games feature have completed, wins from both the initial spin (during the base game) and wins from the free games play feature, as granted from the wheel spin feature, are combined and reflected in a win meter 406, and a credit meter 402 will be increased by that amount, as shown in block 468.

Additional scatter symbols grants higher pay awards, while the wheel spin feature is not affected. Further, base game wins may be paid before transitioning to the wheel gateway feature.

In the occurrence of a particular award (e.g., a large payout), a secondary win meter is displayed, such as in the center of the reels. Moreover, a win may be accompanied by a particular sound and/or visual, which may distinguish the win from sounds/visuals associated with other events (e.g., grant of a free game, a wheel spin trigger symbol, an increase wager, etc.).

Upon completion of the play of the free games, it is determined whether any credits remain for wager by the player, in block 470. For instance, base game play may be continued in block 474 with each wager placed by the player until the player has no credits remaining, or cashes out and leaves the EGM. Once game play has ended, the EGM returns to an attract sequence, with animation, sound, etc., to entice potential players, as shown in block 472. Upon completion of one or more features or games, a summary screen may be presented, as well as a transition to the base game. In some examples, one or more of the transitions will cover the entire display screen, in order to hide visuals as a new scene is loaded. A static point, delay, overlay, or other device may be presented in order to allow the display to properly update.

FIG. 12 illustrates a method 500 of RNG-translation process to determine characteristics of a trigger or trigger symbol, such as when a cumulative free game trigger hits (see, e.g., block 456 of FIG. 11). The RNG-translation process governs selection, presentation, and characteristics of trigger symbols, for example, during play of the interactive electronic gaming machine. In some examples, the game mechanics are configured to increment the cumulative free games meters in response to a cumulative free game trigger, and initiate a wheel spin feature to select a free games play feature, in response to a RNG outcome. The method 500 can be executed as instructions or algorithms including one or more RNGs (e.g., RNG 212), stored on one or more memory devices (e.g., memory 208), and executed via one or more game controllers and/or central controller (e.g., game controller 202, via one or more processors 204), as provided with respect to FIGS. 2 and 3.

In block 502, an input is received at the EGM (e.g., such as a wager, via the UI 302) to being gameplay. In block 504, one or more RNG calls can be activated. For example, the RNG call(s) can be associated with one or more game features or awards. In block 506, the RNG call(s) are processed via RNG engine 316 to generate one or more RNG outcomes. In block 508, the RNG outcomes are applied to one or more lookup tables to determine trigger characteristics. For example, the lookup tables may determine when a particular trigger symbol is presented, at which reel location, how many trigger symbols, visual characteristics of the trigger symbols, what response is prompted by the trigger symbols, etc.

In block 508, one or more outcomes can correspond to a selection a particular trigger symbol or symbols, such as a cumulative free game trigger. For example, a single lookup table could be used to determine a color of the resulting symbol presented to the player (e.g. a green diamond lands on reel five). Alternatively, two separate lookup tables could be used to determine the trigger symbols, such that one lookup table is used to determine the trigger symbol is a particular symbol (e.g. a diamond) and a second lookup table is used to determine characteristics of the symbol (e.g., color, size, etc.). In block 510, the results from the lookup tables are output to the EGM. Based on the presented outputs, the selected trigger symbol(s) are displayed on the UI in block 512. In response to the selected trigger symbol(s), the gameplay then transitions to reflect the features or awards prompted by the selected trigger symbol(s) in block 514.

Although the flowchart of FIGS. 11 and 12 show a specific order of execution, it is understood that the order of execution may differ from that which is depicted. For example, the order of execution of two or more blocks may be scrambled relative to the order shown. Also, two or more blocks shown in succession in FIGS. 11 and 12 may be executed concurrently or with partial concurrence. Further, in some embodiments, one or more of the blocks shown in FIGS. 11 and 12 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

The invention claimed is:

1. A gaming machine comprising a game controller comprising a processor and memory, the memory storing program code including instructions, the game controller executing the instructions which cause the game controller to, at least:

receive a first input corresponding to selection of a wager level of a plurality of wager levels;

generate a first output from a random number generator (RNG) call for a first reel of a plurality of reels;

map the first output to one or more lookup tables;

identify a trigger symbol indicative of an increase of a first or second free game level based on the mapping of the first output, wherein a first wager level of the plurality of wager levels corresponds to a first probability of winning an award at the first free game level and a second probability of winning an award at a second free game level; and cause a free game meter of one or more free game meters corresponding to the trigger symbol to increase in response to the identified free game level.

2. The gaming machine as claimed in claim 1, wherein the first free game level is associated with a lower award value than the second free game level.

3. The gaming machine as claimed in claim 1, wherein a second wager level of the plurality of wager levels corresponds to a third probability of winning an award at the first free game level and a fourth probability of winning an award at the second free game level.

4. The gaming machine as claimed in claim 3, wherein the game controller is further operable to execute instructions which cause the game controller to cause the RNG to output the first, second, third or fourth probabilities in response to the selected wager level.

5. The gaming machine as claimed in claim 1, wherein the game controller is further operable to execute instructions which cause the game controller to:

access one or more progressive jackpot levels; and determine a progressive jackpot level of the one or more progressive jackpot levels based on the selected wager level.

6. The gaming machine as claimed in claim 5, wherein the game controller is further operable to execute instructions which cause the game controller to cause the RNG to output a probability of being granted a progressive jackpot level of the one or more progressive jackpot levels based on the selected wager level.

7. The gaming machine as claimed in claim 5, wherein a number of progressive jackpot levels of the one or more progressive jackpot levels available increases as a selected denomination amount increases.

8. A method of employing an interactive electronic gaming machine operable to receive and interpret inputs from a user interface to implement a reel game to provide cumulative free games and initiate a wheel spin feature, the method comprising:

identifying, by a game controller, a trigger symbol indicative of an increase of a first or second free game level based on a mapping of the first output to one or more lookup tables, wherein a first wager level of a plurality of wager levels corresponds to a first probability of winning an award at the first free game level and a second probability of winning an award at a second free game level; and causing, by the game controller, a free game meter of one or more free game meters corresponding to the trigger symbol to increase in response to the identified free game level.

9. The method of employing an interactive electronic gaming machine of claim 8, the method further comprising:

receiving, in response to an input from the user interface, a first input corresponding to selection of the first or second wager level; and generating, by the game controller, a first output from a random number generator (RNG) call for a first reel of a plurality of reels.

10. The method of employing an interactive electronic gaming machine of claim 8, wherein a second wager level of the plurality of wager levels corresponds to a third probability of winning an award at the first free game level and a fourth probability of winning an award at the second free game level.

11. The method of employing an interactive electronic gaming machine of claim 10, further comprising causing, via the game controller, to cause the RNG to output the first, second, third or fourth probabilities in response to the selected wager level.

12. The method of employing an interactive electronic gaming machine of claim 8, further comprising:

accessing one or more progressive jackpot levels; and determining a progressive jackpot level of the one or more progressive jackpot levels based on the selected wager level.

13. The method of employing an interactive electronic gaming machine of claim 12, further comprising causing, via the game controller, the RNG to output a probability of being granted a progressive jackpot level of the one or more progressive jackpot levels based on the selected wager level.

14. The method of employing an interactive electronic gaming machine of claim 12, further comprising increasing a number of available progressive jackpot levels of the one or more progressive jackpot levels in response to an increase in a selected denomination amount.

15. A graphical user interface (GUI) for presenting a game on a gaming machine, the gaming machine comprising a game controller comprising a processor and memory, the memory storing program code including instructions to provide cumulative free games and initiate a wheel spin feature, the instructions comprising:

presenting a plurality of wager levels, wherein the game controller is operable to:

generate a first output from a random number generator (RNG) call for a first reel of the plurality of reels in response to a first input corresponding to selection of a wager level of the plurality of wager levels;

map the first output to one or more lookup tables; and identify a trigger symbol indicative of an increase of a first or second free game level based on the mapping of the first output, wherein a first wager level of the plurality of wager levels corresponds to a first probability of winning an award at the first free game level and a second probability of winning an award at a second free game level; and presenting an increase of the free game meter of one or more free game meters corresponding to the trigger symbol in response to the identified free game level.

16. The GUI for playing a game on a gaming machine of claim 15, wherein the first free game level is associated with a lower award value than the second free game level.

17. The GUI for playing a game on a gaming machine of claim 15, wherein a second wager level of the plurality of wager levels corresponds to a third probability of winning an award at the first free game level and a fourth probability of winning an award at the second free game level.

18. The GUI for playing a game on a gaming machine of claim 17, wherein the instructions further comprise causing, by the game controller, to cause the RNG to output the first, second, third or fourth probabilities in response to the selected wager level.

19. The GUI for playing a game on a gaming machine of claim 15, wherein the instructions further comprise:

presenting one or more progressive jackpot levels; and presenting a progressive jackpot level of the one or more progressive jackpot levels based on the selected wager level.

20. The GUI for playing a game on a gaming machine of claim 19, wherein the instructions further comprise presenting a number of progressive jackpot levels of the one or more progressive jackpot levels, wherein the number of progressive jackpot levels available increases as a selected denomination amount increases.

* * * * *